(12) United States Patent
Acero et al.

(10) Patent No.: US 7,831,425 B2
(45) Date of Patent: *Nov. 9, 2010

(54) TIME-ANCHORED POSTERIOR INDEXING OF SPEECH

(75) Inventors: Alejandro Acero, Bellevue, WA (US); Asela J. Gunawardana, Seattle, WA (US); Ciprian I. Chelba, Seattle, WA (US); Erik W. Selberg, Seattle, WA (US); Frank Torsten B. Seide, Beijing (CN); Patrick Nguyen, Seattle, WA (US); Roger Peng Yu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 726 days.

This patent is subject to a terminal disclaimer.

(21) Appl. No.: 11/300,735

(22) Filed: Dec. 15, 2005

(65) Prior Publication Data

US 2007/0143110 A1 Jun. 21, 2007

(51) Int. Cl.
*G10L 15/04* (2006.01)
*G10L 15/00* (2006.01)
*G10L 15/28* (2006.01)

(52) U.S. Cl. .................. 704/251; 704/231; 704/252; 704/253; 704/255

(58) Field of Classification Search .............. 704/231, 704/251
See application file for complete search history.

(56) References Cited

U.S. PATENT DOCUMENTS

| 4,783,803 | A | * | 11/1988 | Baker et al. ............. 704/252 |
| 4,977,598 | A | * | 12/1990 | Doddington et al. ........ 704/255 |
| 5,199,077 | A | | 3/1993 | Wilcox et al. |
| 5,241,619 | A | | 8/1993 | Schwartz et al. |
| 5,745,899 | A | * | 4/1998 | Burrows .................. 707/102 |
| 5,799,276 | A | | 8/1998 | Komissarchik et al. |
| 5,963,940 | A | | 10/1999 | Liddy et al. |
| 6,006,221 | A | | 12/1999 | Liddy et al. |
| 6,047,283 | A | * | 4/2000 | Braun ........................ 707/3 |
| 6,169,972 | B1 | | 1/2001 | Kono et al. |
| 6,185,527 | B1 | | 2/2001 | Petkovic et al. |

(Continued)

FOREIGN PATENT DOCUMENTS

EP 1 043 665 A2 10/2000

(Continued)

OTHER PUBLICATIONS

Ljolje, A., Pereira, F. & Riley, M. (1999). Efficient General Lattice Generation and Rescoring. In Proceedings of the 6th European Conference on Speech Communication and Technology, vol. 3, pp. 1251-1254, Budapest.*

(Continued)

*Primary Examiner*—James S Wozniak
*Assistant Examiner*—Michael Ortiz Sanchez
(74) *Attorney, Agent, or Firm*—Christopher J. Volkmann; Westman, Champlin & Kelly, P.A.

(57) ABSTRACT

A computer-implemented method of indexing a speech lattice for search of audio corresponding to the speech lattice is provided. The method includes identifying at least two speech recognition hypotheses for a word which have time ranges satisfying a criteria. The method further includes merging the at least two speech recognition hypotheses to generate a merged speech recognition hypothesis for the word.

16 Claims, 9 Drawing Sheets

U.S. PATENT DOCUMENTS

| | | | |
|---|---|---|---|
| 6,266,658 | B1 | 7/2001 | Adya et al. |
| 6,345,253 | B1 | 2/2002 | Viswanathan |
| 6,374,220 | B1 | 4/2002 | Kao |
| 6,397,181 | B1 | 5/2002 | Li et al. |
| 6,421,645 | B1 | 7/2002 | Beigi et al. |
| 6,424,946 | B1 | 7/2002 | Tritschler et al. |
| 6,584,458 | B1 | 6/2003 | Millett et al. |
| 6,611,803 | B1 | 8/2003 | Furuyama et al. |
| 6,678,689 | B2 | 1/2004 | Yoon et al. |
| 6,873,993 | B2 | 3/2005 | Charlesworth et al. |
| 6,877,134 | B1 | 4/2005 | Fuller et al. |
| 6,907,397 | B2 | 6/2005 | Kryze et al. |
| 7,089,188 | B2 | 8/2006 | Logan et al. |
| 7,092,883 | B1 | 8/2006 | Gretter et al. |
| 7,216,077 | B1 | 5/2007 | Padmanabhan et al. |
| 7,266,553 | B1 | 9/2007 | Anderson et al. |
| 7,313,554 | B2 | 12/2007 | Chen et al. |
| 7,379,870 | B1 | 5/2008 | Belvin et al. |
| 7,634,407 | B2 | 12/2009 | Chelba et al. |
| 2002/0022960 | A1 | 2/2002 | Charlesworth et al. |
| 2002/0052870 | A1* | 5/2002 | Charlesworth et al. ......... 707/3 |
| 2002/0111792 | A1 | 8/2002 | Cherny |
| 2002/0143536 | A1* | 10/2002 | Chien et al. .................. 704/251 |
| 2002/0184196 | A1 | 12/2002 | Lehmeier et al. |
| 2003/0055634 | A1 | 3/2003 | Hidaka et al. |
| 2003/0088397 | A1 | 5/2003 | Karas et al. |
| 2003/0177108 | A1 | 9/2003 | Charlesworth et al. |
| 2003/0187643 | A1 | 10/2003 | Van Thong et al. |
| 2003/0187649 | A1 | 10/2003 | Logan et al. |
| 2003/0200091 | A1 | 10/2003 | Furuyama et al. |
| 2003/0204399 | A1 | 10/2003 | Wolf et al. |
| 2004/0044952 | A1 | 3/2004 | Jiang et al. |
| 2004/0162730 | A1 | 8/2004 | Mahajan et al. |
| 2004/0199385 | A1 | 10/2004 | Deligne et al. |
| 2005/0010412 | A1 | 1/2005 | Aronowitz |
| 2005/0060139 | A1 | 3/2005 | Corston-Oliver et al. |
| 2005/0080631 | A1 | 4/2005 | Abe et al. |
| 2005/0096908 | A1 | 5/2005 | Bacchiani et al. |
| 2005/0108012 | A1* | 5/2005 | Roth et al. .................. 704/252 |
| 2005/0119885 | A1 | 6/2005 | Axelrod et al. |
| 2005/0159953 | A1* | 7/2005 | Seide et al. ................. 704/254 |
| 2005/0203751 | A1* | 9/2005 | Stevens et al. .............. 704/276 |
| 2005/0228671 | A1 | 10/2005 | Olorenshaw et al. |
| 2006/0074895 | A1 | 4/2006 | Belknap |
| 2006/0212294 | A1 | 9/2006 | Gorin et al. |
| 2006/0265222 | A1 | 11/2006 | Chelba et al. |
| 2007/0005574 | A1 | 1/2007 | Crispo et al. |
| 2007/0106512 | A1 | 5/2007 | Acero et al. |

FOREIGN PATENT DOCUMENTS

| | | |
|---|---|---|
| EP | 01113371 | 4/2001 |
| WO | 00/54168 A2 | 9/2000 |
| WO | 02/27546 A2 | 4/2002 |

OTHER PUBLICATIONS

Chelba et al., C., "Position Specific Posterior Lattices for Indexing Speech", Proceedings of the 43$^{rd}$ Annual Meeting of the ACL, pp. 443-450, Ann Arbor, Jun. 2005.

Chelba et al., C. "Speech OGLE: Indexing Uncertainty for Spoken Document Search", Proceedings of the ACL Interactive Poster and Demonstration Sessions, pp. 41-44, Ann Arbor, Jun. 2005.

Saraclar et al., M., "Lattice-Based Search for Spoken Utterance Retrieval", Human Language Technology Conference/North American Chapter of the Association for Computational Linguistics Annual Meeting, pp. 129-136, May 2004.

Mangu et al., L, "Finding consensus in speech recognition: word error minimization and other applications of confusion networks", Computer Speech and Language vol. 14, No. 4, Oct. 7, 2000.

Yu et al., P., "A Hybrid Word/Phoneme-Based Approach for Improved Vocabulary-Independent Search in Spontaneous Speech", 8th International Conference on Spoken Language Processing, Oct. 2004.

U.S. Appl. No. 11/269,872 entitled "Indexing and Searching Speech With Text Meta-Data", filed Nov. 8, 2005.

Church, K., "Speech and Language Processing: Where Have We Been and Where Are We Going?", 8th European Conference on Speech Communication and Technology, Geneva, Switzerland, Sep. 2003.

Brown et al., M. G., "Open-Vocabulary Speech Indexing for Voice and Video Mail Retrieval", in Proceedings ACM Multimedia 96, Boston, pp. 307-316, Nov. 1996.

James, D. A., The Application of Classical Information Retrieval Techniques to Spoken Documents, Ph.D. Thesis, University of Cambridge, Downing College, Feb. 1995.

Brin et al., S., "The anatomy of a large-scale hypertextual web search engine", Computer Networks and ISDN Systems, vol. 30, No. 1-7, pp. 107-117, 1998.

U.S. Appl. No. 11/133,515 entitled "Method and Apparatus for Indexing Speech", filed May 20, 2005.

MSN Search, "Index Serving Core", design specification, 2004.

Garofolo et al., J. S., "The TREC Spoken Document Retrieval Track: A Success Story," Proceedings of the Recherche d'Informations Assiste par Ordinateur: ContentBased Multimedia Information Access Conference, pp. 1-23, Apr. 12-14, 2000.

Rabiner, L. R., "A Tutorial on Hidden Markov Models and Selected Applications in Speech Recognition", in Proceedings of Institute of Electrical & Electronics Engineers, vol. 77, No. 2, pp. 257-286, Feb. 1989.

Glass et al., J., "Analysis and Processing of Lecture Audio Data: Preliminary Investigations", In Proceedings of the Human Language Technology Conference/North American chapter of the Association for Computational Linguistics Workshop on Interdisciplinary Approaches to Speech Indexing and Retrieval, pp. 9-12, May 2004.

Logan et al., B., "Word and sub-word Indexing Approaches for Reducing the Effects of OOV Queries on Spoken Audio", Proceedings of the Second International Conference on Human Language Technology Research, pp. 31-35, Mar. 2002.

Ng, K., "Subword-based Approaches for Spoken Document Retrieval", PhD Thesis, Massachusetts Institute of Technology (MIT), Cambridge, MA, pp. 1-52, Feb. 2000.

Seide et al, F., "Vocabulary-Independent Search in Spontaneous Speech", IEEE International Conference on Acoustics, Speech, and Signal Processing, vol. 1, pp. I-253-256, May 2004.

Siegler, M. A., "Integration of Continuous Speech Recognition and Information Retrieval for Mutually Optimal Performance", Ph.D. thesis, Carneigie Mellon University, pp. 1-83, Dec. 1999.

Woodland et al., P. C., "Effects of Out of Vocabulary Words in Spoken Document Retrieval", proceedings of SIGIR 2000, pp. 1-3, Jul. 2000.

International Search Report and Written Opinion dated Mar. 30, 2007 for Application No. PCT/US2006/042723, filed Oct. 31, 2006.

Aubert, X. L., "Fast Look-Ahead Pruning Strategies in Continuous Speech Recognition", 1989 International Conference on Acoustics, Speech, and Signal Processing, pp. 659-662, May 1989.

Bulyko et al., I., "Getting More Mileage from Web Text Sources for Conversational Speech Language Modeling using Class-Dependent Mixtures", Proceedings of the 2003 Conference of the North American Chapter of the Association for Computational Linguistics on Human Language Technology: companion volume of the Proceedings of HLT-NAACL, vol. 2, pp. 7-9, 2003.

Glavitsch et al., U., "Metadata for Integrating Speech Documents in a Text Retrieval System", Sigmod Record, vol. 23, No. 4, pp. 57-63, Dec. 1994.

Lee et al., L., "Spoken Document Understanding and Organization", IEEE Signal Processing Magazine, vol. 22, No. 5, pp. 42-60, Sep. 2005.

Aubert, X., "Fast Look-Ahead Pruning Strategies in Continuous Speech Recognition", International Conference on Acoustics, Speech, and Signal Processing, vol. 1, pp. 659-662, May 1989.

Thong et al., J. V., "Speechbot: An Experimental Speech-Based Search Engine for Multimedia Content on the Web", IEEE Transactions on Multimedia, vol. 4, No. 1, pp. 88-96, Mar. 2002.

N. Moreau, H. G. Kim, and T. Sikora, "Phone-based spoken document retrieval in conformance with the mpeg-7 standard", Proc. of the Audio Engineering Society 25th International Conference, 2004.

A. T. Lindsay, S. Srinivasan, J. P. A. Charlesworth, P. N. Garner, and W. Kriechbaum, "Representation and linking mechanisms for audio in MPEG-7", Signal Processing: Image Commun., vol. 16, pp. 193-209, 2000.

N. Moreau, H. G. Kim, and T. Sikora, "Combination of Phone N-Grams for a MPEG-7-based Spoken Document Retrieval System", to be published in EUSIPCO 2004.

J. P. A. Charlesworth and P. N. Garner, "Spoken Content Representation in MPEG-7", IEEE Trans on Circuits and Systems for Video Technology, vol. 11, No. 6, pp. 730-736, Jun. 2001.

Dharanipragada, S., and Roukos, S. A Fast vocabulary independent algorithm for spotting words in speech. In proceedings of ICASSP 98, 1998.

Huang, X., Acero, A., Alleva, F., Hwang, M., Jiang, L. and Mahajan, M. Microsoft Windows Highly Intelligent Speech Recognizer: Whisper. In IEEE International Conference on Acoustics, Speech, and Signal Processing, May 1995, vol. 1, pp. 93-96.

Cyril Allauzen, Mehryar Mohri, Murat Saraclar, "General Indexation of Weighted Automata—Application to Spoken Utterance Retrieval", in Proc. HLT-NAACL, 2004.

Official Search Report and Written Opinion of the Korean Patent Office in foreign application No. PCT/US2006/042733, filed Oct. 31, 2006.

J.T. Foote, S.J. Young, G.J. F Jones and K. Sparck Jones, 1997, "Unconstrained Keyword Spotting Using Phone Lattices with Application to Spoken Document Retrieval", Computer Speech and Language, 11(2):207-224.

Yue-Shi Lee and Hsin-Hsi Chen, "A Multimedia Retrieval System for Retrieving Chinese Text and Speech Documents", 1999.

D.A. James, "The Application of Classical Information Retrieval Techniques to Spoken Documents", PhD Thesis, Cambridge University, Downing College, Feb. 1995.

Lidia Mangu, Eric Brill, Andreas Stolcke, "Finding Consensus Among Words: Lattice-Based Word Error Minimization", Sep. 1999.

Yang Liu, Mary P. Harper, Michael T. Johnson, Leah H. Jamieson, "The Effect of Pruning and Compression on Graphical Representations of the Output of a Speech Recognizer", Feb. 14, 2002.

Hillard et al., "Improving Automatic Sentence Boundary Detection with Confusion Networks", 2004.

Peter S., Cardillo, Mark Clements and Michael S. Miller, "Phonetic Searching vs. LVCSR: How to Find What You Really Want in Audio Archives", 2002.

Begeja et al., "A System for Searching and Browsing Spoken Communications", 2004.

Alexandre Ferrieux and Stephane Peillon, "Phoneme-Level Indexing for Fast and Vocabulary-Independent Voice/Voice Retrieval", 1999.

Alluzen et al., "Open Vocabulary ASR for Audiovisual Document Indexation", ICASSP 2005.

Yue-Shi Lee and Hsin-Hsi Chen, "Metadata for Integrating Chinese Text and Speech Documents in a Multimedia Retrieval System", 1997.

Lidia Mangu and Eric Brill, "Lattice Compression in the Consensual Post-Processing Framework", 1999.

First Office Action from Chinese application No. 200680041464.0, filed Oct. 31, 2006, dated Nov. 27, 2009.

Douglas Oard, Bhuvana Ramabhadran, and Samuel Gustman (2004), "Building an Information Retrieval Test Collection for Spontaneous Conversational Speech", in Proceedings of SIGIR, 2004.

J.P.A. Charlesworth and P.N. Garner, "Spoken Content Metadata and MPEG-7", in Proc. ACM MM2000 Workshops, 2000, pp. 81-84.

Prosection Documents Associated with U.S. Appl. No. 11/270,673 including: Office Action mailed May 10, 2010 Amendment filed Mar. 31, 2010 Final Office Action mailed Jan. 20, 1010 Amendment filed Nov. 9, 2009.

Prosecution Documents Associated with U.S. Appl. No. 11/269,872 including: Notice of Allowance mailed Jun. 29, 2010 Notice of Withdrawal of Patent mailed Jun. 11, 2010 Petition to Withdrawal Patent filed Jun. 9, 2010 Issue Notification mailed Jun. 9, 2010.

Oard et al., D. W., "Building an Information Retrieval Test Collection for Spontaneous Conversational Speech", in proceedings of SIGIR '04, pp. 41-48, Jul. 2004.

Charlesworth et al., J. P. A., "Spoken Content Metadata and MPEG-7", in proceedings of ACM Multimedia Workshop, pp. 81-84, Oct./Nov. 2000.

* cited by examiner

They <0.1,0.6> = 0.3
They <0.1,0.6> = 0.6   ⟹   They <0.1,0.6> = 0.9 happy <1.0,1.3> = 0.3
happy <0.9,1.3> = 0.01   ⟹   happy <1.0,1.3> = 0.31

```
<hits key="SCIENCE">
 <stream type="audio">
  <doc index="0">
    <hit ts="0.57" te="0.85" c="-5.832"/>
    <hit ts="0.57" te="0.86" c="-2.487"/>
    <hit ts="0.57" te="0.87" c="-1.860"/>
    <hit ts="0.57" te="0.88" c="-1.592"/>
    <hit ts="0.60" te="0.91" c="-2.183"/>
    <hit ts="0.60" te="0.92" c="-3.172"/>
    <hit ts="0.60" te="0.94" c="-2.953"/>
    <hit ts="0.60" te="0.95" c="-2.158"/>
    <hit ts="7.28" te="7.95" c="-2.011"/>
    <hit ts="7.29" te="7.86" c="-3.223"/>
    <hit ts="7.29" te="7.87" c="-2.702"/>
    <hit ts="7.29" te="7.95" c="-0.342"/>
  </doc>
 </stream>
</hits>
```

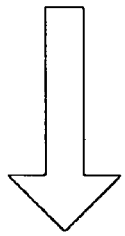

```
<hits key="SCIENCE">
    <stream type="audio">
      <doc index="0">
        <hit ts="0.57" te="0.88" c="-0.511"/>
        <hit ts="0.60" te="0.95" c="-1.785"/>
        <hit ts="7.29" te="7.87" c="-2.236"/>
        <hit ts="7.29" te="7.95" c="-0.169"/>
      </doc>
    </stream>
  </hits>
```

FIG. 6-2

TIME-ANCHORED POSTERIOR INDEXING OF SPEECH

BACKGROUND

Searching through vast collections of documents for a particular document of interest has become commonplace in computing environments. In particular, searches performed on web pages found on the Internet are performed by a large number of search services. To perform these text-based searches, search services typically construct an inverted index that has a separate entry for each word found in the documents covered by the search service. Each entry typically lists all of the documents and the positions within the documents where the word can be found. Many of these search services use the position information to determine if a document contains words in a particular order and/or within a particular distance of each other. This order and distance information can then be used to rank the documents based on an input query with documents that have the words of the query in the same order as the query being ranked higher than other documents.

With more and more audios (or audio tracks of videos) appearing on the web and the trend towards on-demand video, the desire or need to search audio tracks available on the web and on-demand distribution channels is also becoming stronger. An approach of using Speech-To-Text (speech recognition) technology to transcribe audio to text, then applying text level indexing to the text, frequently does not yield good accuracy. The poor accuracy can be a reflection of web audio being of poor acoustic quality, very different domains compared to those used for training the speech recognition system, and/or complicated background environments. These factors can result in very high recognition error rate for an automatic speech recognition system (ASR).

The discussion above is merely provided for general background information and is not intended to be used as an aid in determining the scope of the claimed subject matter.

SUMMARY

Because speech recognition models consider words in their context (surrounding phonemes and neighboring words), there often are multiple candidates for the same word with identical or similar time boundaries. These multiple candidates may differ in their context, and they can result in a huge search index for a spoken document. In some disclosed embodiments, to reduce the size of the index for the spoken document while maintaining accuracy, hypotheses for the same word and having the same or similar time ranges are merged into a single hypothesis. The merged hypothesis' posterior can be in some embodiments the sum of the unmerged ones. Also, in some embodiments, if hypotheses with non-identical time boundaries are merged, the start and end time from the best unmerged hypothesis can be used for the resulting merged hypothesis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 5-1 is an example of a recognition lattice.

FIG. 5-2 is an example of merging speech recognition hypotheses in constructing an index.

FIGS. 6-1 and 6-2 are examples of merging speech recognition hypotheses in constructing an index.

DETAILED DESCRIPTION

Disclosed embodiments include indexing methods for audio (spoken documents), for example audio available over the web. One efficient way to deal with high word error rate is to index speech recognition alternates (lattice) for a spoken document, instead of indexing only a single best estimate of text from a speech signal for the document. The indexing methods can be used to integrate the indexing of audio with existing search architectures. The indexing methods generate indexes using word lattices, with index size being reduced by merging word hypotheses within a same, or similar, time range. Examples of disclosed concepts include time-anchored posterior-probability merging of word hypotheses to balance index size and search accuracy; time quantization and associating quantized time points with document locations; and quantization of posteriors and word durations into attribute values of bits sizes (e.g., 8-bit) which allow integration with existing search architectures. These concepts are described below in detail.

Figure 1:
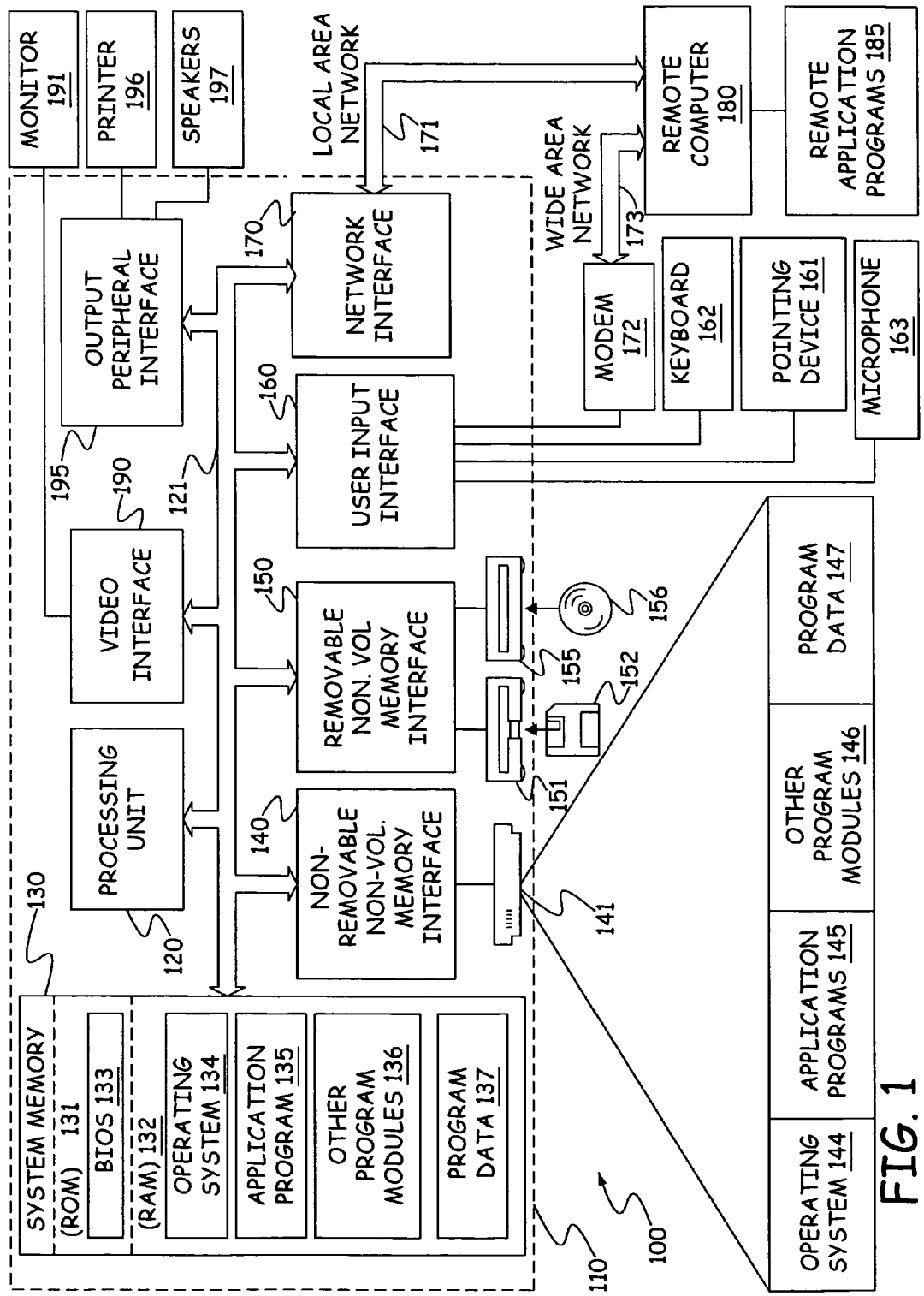
FIG. 1 is a block diagram of a one computing environment in which some embodiments may be practiced.
Figure 2:
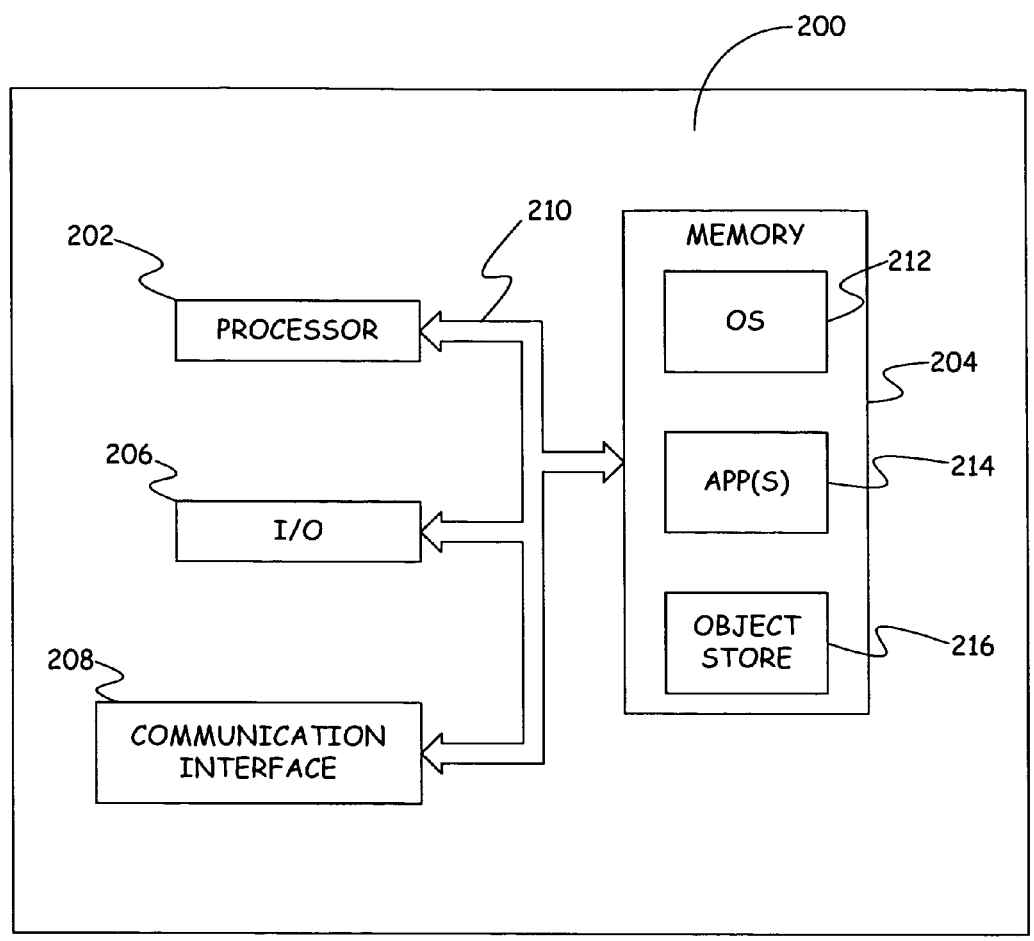
FIG. 2 is a block diagram of an alternative computing environment in which some embodiments may be practiced.

The disclosed embodiments can be implemented in a variety of computing environments. Before describing the embodiments in greater detail, a discussion of example computing environments in which the embodiments can be implemented may be useful. FIGS. 1 and 2 illustrate two such computing environments which can represent any of these different types of computing environments.

FIG. 1 illustrates an example of a suitable computing system environment 100 on which one or more aspects of embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

FIG. 2 is a block diagram of a mobile device 200, which is another exemplary computing environment in which the indexing and search methods can be implemented. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

As introduced above, disclosed embodiments include methods of indexing web audios (or video sound tracks or other audio files), which are typically from different domains, with poor acoustic quality and complicated backgrounds. As noted, a straightforward method of indexing spoken documents is to use speech recognition to transcribe each document into text, and then apply text-level indexing. However, previous research has shown performance degradation when speech recognition error rates are high, which is the reality for certain types of audio, and particularly for web audios.

In addition to the most probable text transcript, speech recognizers can also generate recognition alternates, which are beneficial for audio searches. They are commonly stored as graph structures called "lattices." Example lattices are described for illustrative purposes below. In accordance with disclosed embodiments, speech lattices are used which have multiple candidate words available at the same (or similar) time points. Each word hypothesis is provided with its own start and end time. It is known that for each word, its posterior probability serving as a confidence score can be computed efficiently from the lattice.

In some embodiments, each word hypothesis in the lattice is represented as a 4-tuple $(t_s, t_e, w, P)$, where $t_s$ and $t_e$ are the start time and the end time, w is the word ID, and P is the posterior. "Indexing" in the context of disclosed embodiments now means to re-order these tuples by word ID, such that at search time, all hypothesized locations of a query term can be retrieved efficiently by an index lookup by word ID. For multi-word (phrase) queries, the retrieved hypothesis lists are intersected, requiring word time boundaries to match.

Because speech recognition models consider words in their context (surrounding phonemes and neighboring words), there often are multiple candidates for the same word with identical or similar time boundaries, but differing in their context, resulting in a huge index. To reduce the size of the index while maintaining accuracy, some disclosed embodiments merge hypotheses with same word ID and the same or similar time ranges. The merged hypothesis' posterior can then be the sum of the unmerged ones. If hypotheses with similar, but not identical, time boundaries are merged, the start and end time from the best unmerged hypothesis can be used for the new merged hypothesis. In accordance with another disclosed aspect, as a result of the merging of hypotheses with slightly different time boundaries, some tolerance is allowed when matching connected words of a phrase query. In other words, in some embodiments, two words can be regarded as consecutive if the end time of first word is within some range of the start time of second word. Before describing these and other features in greater detail, it is useful to introduce methods and systems for forming and using an index of spoken documents.

Figure 3:
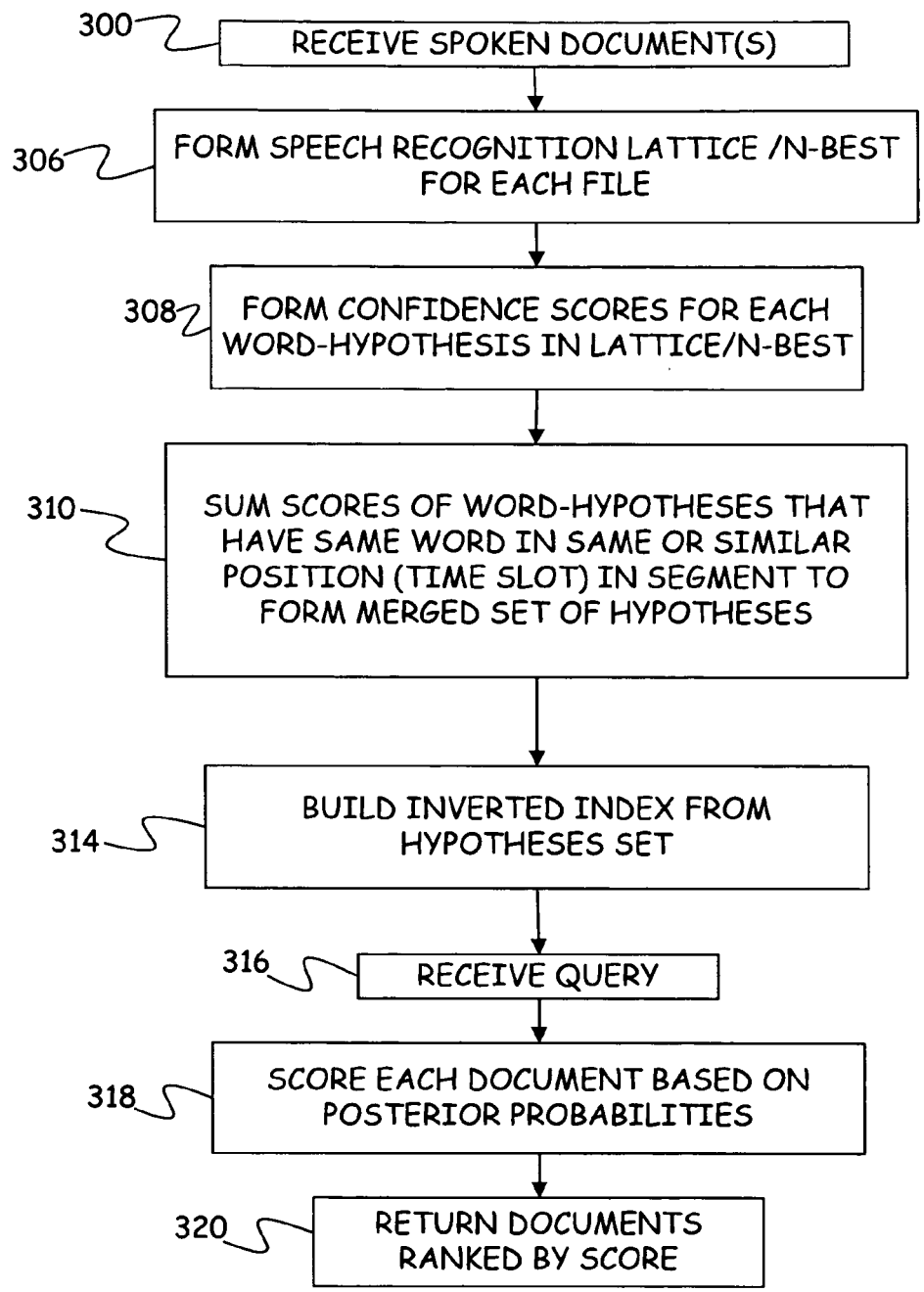
FIG. 3 is a flow diagram of a method of constructing and searching an index.
Figure 4:
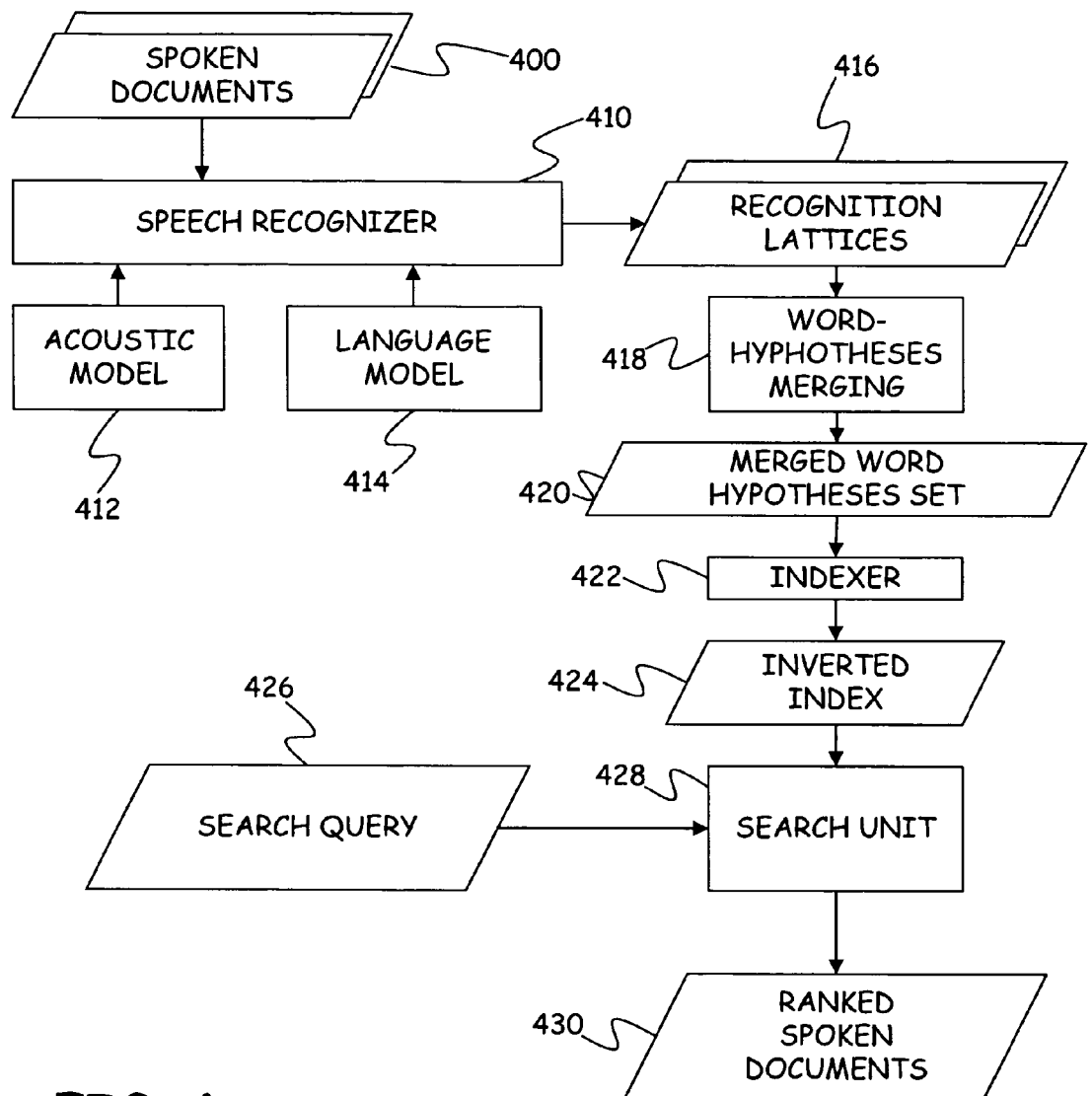
FIG. 4 is a block diagram of elements used in constructing and searching an index.

FIGS. 3 and 4 provide a method and a block diagram, respectively, for forming and using an index of spoken documents under one embodiment. In step 300 of FIG. 3, spoken documents 400 are received. These spoken documents may be stored so that all of the documents can be processed at the same time or individual documents may be received and processed separately. In other embodiments, each document is received in a streaming manner and is indexed without having to store the spoken document.

In general, a spoken document is a collection of speech signals that are related to each other in some manner. For example, speech signals that occur at a meeting, speech signals associated with a lecture, or speech signals associated with a multimedia document such as a movie or a multimedia presentation. To form spoken documents 400, some embodiments separate the speech content from other content in a multimedia document. For example, the speech content may be removed from a movie to separate it from the video and musical content of the movie. When the spoken document represents only the speech content of a multimedia document, a mapping may be stored that links the spoken document to the multimedia document. This allows a path to the multimedia document to be returned in the search results. In other cases there is text meta-data (title, abstract, author, description) that comes with a given spoken document.

Each of the spoken documents 400 is provided to a speech recognizer 410, which uses an acoustic model 412 and a language model 414 to decode the spoken segments into possible text sequences at step 306 of FIG. 3. Typically, speech recognizer 410 performs the recognition based on a sequence of feature vectors that represent the speech in the spoken segments. Step 306 results in the formation of an N-best speech recognition lattice for each file.

The feature vectors used by the speech recognizer are formed by first converting an analog speech signal into digital values using an analog-to-digital converter. In several embodiments, the analog-to-digital converter samples the analog signal at 16 kHz and 16 bits per sample, thereby creating 32 kilobytes of speech data per second. These digital values are provided to a frame constructor, which, in one embodiment, groups the values into 25 millisecond frames that start 10 milliseconds apart. The frames of data created by the frame constructor are provided to a feature extractor, which extracts a feature from each frame.

Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that embodiments are not limited to these feature extraction modules and that other modules may be used within the context of disclosed embodiments.

The steps needed to form the feature vectors can be performed entirely by speech recognizer 410, or some or all of the steps may be performed when generating spoken documents 400. Thus, spoken documents 400 may be stored as analog signals, digital signals, frames of digital signals, or feature vectors.

During recognition, each feature vector is applied to acoustic model 412, which provides a probability of each of a set of phonetic units given an input feature vector. The acoustic probability of a word is determined by combining the probabilities of the phonetic units that form the word. In addition, each word receives a language model score that indicates the probability of a word or a sequence of words appearing in a particular language. Using the scores provided by acoustic model 412 and language model 414, speech recognizer 410 is able to form a recognition lattice 416 that contains recognition results for a speech segment. Note that in most embodiments, speech recognizer 416 prunes unlikely word sequences from lattice 416 as it constructs the lattice, leaving only the top N recognition results in the lattice. In other embodiments, speech recognizer 410 produces an n-best list of recognition results that provides a list of the n most likely word sequences given the speech segment.

Figures 1, 2, 5:
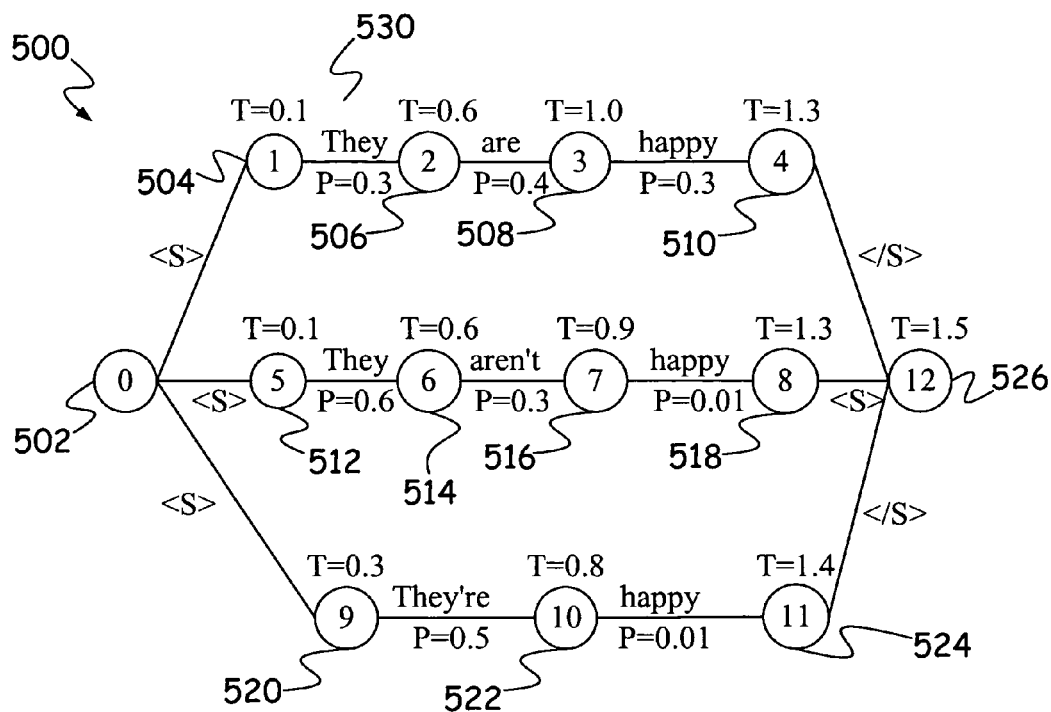

FIG. 5-1 provides an example of a recognition lattice 500 produced by speech recognizer 410. Lattice 500 includes states (also referred to as nodes) 502, 504, 506, 508, 510, 512, 514, 516, 518, 520, 522, 524, and 526 which are labeled as states 0, 1, 2, 3, 4, 5, 6, 7, 8, 9, 10, 11, and 12, respectively. Every transition between states in lattice 500 is associated with a word hypothesis, a start symbol or an end symbol.

As represented in FIG. 5-1, each word hypothesis has an associated start time $t_s$, end time $t_e$, and posterior or probability P. Although the word IDs are not shown not shown in FIG. 5-1, as described above, each word hypothesis in the lattice can be represented as a 4-tuple $(t_s, t_e, w, P)$, where $t_s$ and $t_e$ are the start time and the end time, w is the word ID, and P is the posterior. For example, the word hypothesis "They" 530 between states 504 and 506 has a quantized start time of 0.1 seconds and a quantized end time of 0.6 seconds. The posterior for this word hypothesis is 0.3. Note that it is not required that the start/end times are quantized at this point, but instead they may be quantized after merging which is described below.

Speech recognition lattice 500 of FIG. 5-1 shows that a single word may appear at different states but with the same or similar start and end times. For example, the word "They" has a start time of 0.1 and an end time of 0.6 in each of two illustrated instances in lattice 500. The word "happy" appears with three different start times (0.8, 0.9 and 1.0) and two different end times (1.3 and 1.4).

In accordance with some disclosed embodiments, when generating an index from a lattice as will be described below, multiple word hypotheses for a particular word (as represented by a word ID) with the same or similar (within some predetermined range) start and end times are combined or merged into a single hypothesis for that word. The posteriors for the different merged hypotheses are added together. When the different word hypotheses have slightly different start and/or end times, but are within an acceptable range for combining, the resulting merged hypothesis can be assigned the start and stop times of the best (most probable) of the multiple hypotheses which have been combined.

For example, FIG. 5-2 illustrates two examples of hypotheses merging. In the first, corresponding to the word "They", the start and stop times are identical between the two hypotheses. Thus, the resulting merged hypothesis has the same start and stop times (0.1 and 0.6) as the original hypotheses, and a posterior which is a combination of those from the original hypotheses (0.3+0.9).

In the second example, two hypotheses for the word "happy" are merged, but the two hypotheses did not have identical start times. Assuming an acceptable range of difference between start times (or end times) is 0.1 or greater, these two hypotheses can be merged into a single hypothesis having the combined posterior (0.3+0.01). Note that the resulting hypothesis has the start time (1.0) of the best hypothesis for the word "happy". Assuming that the acceptable range of difference between start times or between end times was exactly 0.1, it can be seen that a third hypothesis for the word "happy", between states 522 and 524 in FIG. 5-1, is not combined with the other two because it has a start time (0.8) which is more than 0.1 seconds before the start time (1.0) of the best hypothesis.

Figures 1, 6:
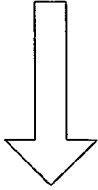

Further examples of the merging methods employed in some embodiments are illustrated in FIGS. 6-1 and 6-2. FIG. 6-1 shows at 605 portions of seven different potential index entries for the word "computer". Using the merging techniques described above, the seven different hypotheses represented are merged into two different hypotheses represented as portion of index entries 611 and 612. Assuming a start time (illustrated in FIG. 6-1 as "ts") or end time (illustrated in FIG. 6-1 as "te") tolerance of at least 0.4 seconds, the hypotheses 606 corresponding to the first three potential index entries are combined into the hypothesis represented at 611. The resulting hypothesis represented at 611 has a posterior (represented in logarithmic form as "c=−0.058") which is a combination of the three hypotheses represented at 606, but start and stop times of the best of the three hypotheses. The same process is used to merge the hypotheses represented at 607 into the hypothesis represented at 612. Similarly, these techniques are used to merge hypotheses for the word "science" as shown in FIG. 6-2.

FIGS. 6-1 and 6-2 can also be used to illustrate search methods allowing time tolerance when matching connected words of a phrase query such as "computer science". Because some hypotheses are merged, with the resulting hypothesis adopting the start and stop times of the best hypothesis out of the combined hypotheses, it is useful to allow tolerance when considering start and stop times of consecutive words. For example, when searching for the phrase "computer science", a search engine could be configured to search the index for hypotheses in which the end time of "computer" is an exact match with the start time of "science". However, to improve performance while allowing the merging process to be used to reduce the size of indexes, some embodiments only require that the end time of the first word of a phrase be within a predetermined time range of the start time of the second word of the phase.

In alternate example embodiments, merging hypotheses as represented at step 310 in FIG. 3 (and also at step 710 in FIG. 7 described below), and as carried out by component 418 in FIG. 4, can be done in two ways: (1) driven by merging edges, or (2) driven by merging nodes (of which merging of edges is then a consequence).

Embodiment 1

"TMI (Edge)": Edge-Driven Clustering of Word Hypotheses

This method treats all entries of words individually. For each entry of a word, an agglomerative clustering procedure is applied as follows:
1. (START) mark all sub-entries "not done"
2. (LOOP) select the sub-entry "Ebest" with the highest posterior probability, amongst all sub-entries marked "not done"
3. select all other sub-entries with "similar" time boundaries. For each sub-entry Ei:
   1. add Ei's posterior to the posterior of Ebest
   2. discard Ei
4. mark "Ebest" as "done" and, if there are still sub-entries left not marked as "done," go back to (LOOP)

Time boundaries of Ebest and Ei are considered "similar" if and only if:
  Ebest and Ei overlap in time
  difference between start times of both is below a threshold T
  difference between end times of both is below a threshold T where in an example embodiment, "T" is defined as a percentage of the duration of Ebest, such as 33%, but bounded by a minimum and a maximum value, e.g. 50 ms and 100 ms.

Embodiment 2

"TMI (Node)": Node-Driven Merging of Word Hypotheses

This method is applied to the lattice and processes all word hypotheses together to achieve a global optimum. Unlike the TMI (edge) technique, this method is not an agglomerative but a partitioning algorithm. Nodes are partitioned, and dynamic programming is used to choose an optimal partitioning as follows:
1. Sort all lattice nodes in time.
2. (PARTITION) Determine all possible partitionings of lattice nodes into ranges of temporally adjacent nodes under the following conditions:
   (PRIMARY CONDITION) Merging all nodes in a range cannot create loops, i.e. for a range of nodes to be qualified, there can be no edge starting and ending in the same range.
   (OPTIONAL SECONDARY CONDITION) Node ranges can span no more than 250 ms (25 frames).
   (OPTIONAL EXCEPTION TO PRIMARY CONDITION) Edges with posterior below a pre-set pruning threshold and silence edges are exempt from the primary condition, i.e. they are allowed to become loops.
3. (OPTIMIZE) Amongst all admissible partitionings, choose the one with the smallest number of partitions.
4. (EDGE MERGING) Merge all nodes in each range. After this operation, there may be multiple edges with the same word label and the same start and end node-range. These are merged into a single entry, their posteriors being summed up. Edges that violate (PRIMARY CONDITION), which are possible due to (OPTIONAL EXCEPTION TO PRIMARY CONDITION), are deleted.
5. (PRUNING) Finally discard edges with posterior below a pruning threshold. As an exception, edges on the top-1 path can be kept.

The separation of the PARTITION and OPTIMIZE steps is for mathematical clarity only. In actual implementations, they cannot be separated due to the combinatorial explosion of enumerating all possible partitions. Instead, both steps must be integrated, and then the optimal solution can be found efficiently using a known technique called "dynamic programming" (DP).

The objective of the OPTIMIZE step is defined as minimizing the number of nodes, and dynamic programming will provide a globally optimal solution. Methods of applying DP to accomplish this task will be readily understood by those of skill in the art. The PARTITION step is defined such that the overall method becomes admissible to a DP solution, enabling a globally optimal solution to be found.

In example embodiments, the resulting hypothesis set can be represented in two ways in the indexing engine 422. Merged node ranges could be either represented by their quantized time stamp (as in "TMI (edge)") or by a range id similar to a position specific posterior lattice (PSPL) bin id. The latter option requires less bits in the index, but a separate time loop-up table for use in snippet generation.

A motivation for the "TMI (node)" technique is that both PSPL and "TMI (edge)" cannot strictly enforce in-order matching of phrases. For example, PSPL can match a spoken "A B" as phrase "B A" if there are B and A entries originating from paths with different history lengths. The TMI (edge) technique can allow out-of-order matching for very short words due to the aggressive time tolerance.

The "TMI (node)" technique allows overlaps and gaps, but only less than one word. Start times (as well as end times) are guaranteed to remain in-order. This can be an important property, because the purpose of all methods is phrase matching.

Now referring back to FIGS. 3 and 4, under one embodiment an index 424 is formed or built in step 314 by providing an entry for every word in the lattice (e.g. lattice 416). In each entry, information is provided for every occurrence of the entry's word in the lattice. This information includes a document identifier, a representation of start and end time, and the probability associated with that word at that time span. Each word's entries for all lattices in the document collection are merged to form an overall entry. The entirety of all such merged entries makes up the index.

Once the index has been constructed, a search may be performed to identify a spoken document based on a search query. In particular, at step 316, a search query 426 is received by a search unit 428. Search unit 428 accesses inverted index 424 and retrieves the document identifier, time position, and probability of each sub-entry for each word of the query.

Some recognizers may map words outside of the recognizer's vocabulary to an unknown token, UNK, which cannot be matched in any document. Thus, no entry for UNK is included in the index.

At step 318, a score is determined for each document that is returned from the search of inverted index 424. The documents that are returned from the search can be limited such that every document that is returned includes all of the words of the query. Alternatively, any document that contains at least one word of the query can be returned at this stage.

Using the probabilities returned from inverted index 424, the scores for each document can be calculated using any of a number of techniques. For example, these techniques can include weights denoting the importance of a word in discriminating documents. In accordance with one alternate technique, the scores for each document can be calculated by first calculating a collection of composite n-gram scores for each document. Each composite n-gram score can be formed by summing individual n-gram scores over all possible formations of an n-gram in the query using:

$$S_{N-gram}(D, Q) = \sum_{i=1}^{K-N+1} S(D, q_i \ldots q_{i+N-1}) \qquad \text{EQ. 1}$$

where D is the document, K is the number of words in the query, N is the number words in the n-gram, Q is the query, and $S(D, q_i \ldots q_{i+N-1})$ is the score for a single n-gram beginning at point i in the query, which is calculated as:

$$S(D, q_i \ldots q_{i+N-1}) = \log\left[1 + \sum_{s_0, \ldots, s_{N-1}: te(s_j) = ts(s_{j+1}) \wedge w(s_j) = q_i + j} \prod_{l=0}^{N-1} P(s_l | D)\right] \qquad \text{EQ. 2}$$

where the inner summation on the right-hand side is performed over the first k-N word positions in a segment and the outer summation is performed across all segments associated with document D. In EQ. 2, w(s), ts(s), te(s), P(s|D) are the word identity, start time, end time, and posterior probability stored in the inverted index for index item s.

Other types of n-grams, such as skip n-grams (which allow certain query words to be skipped) can also be used.

If more than one composite n-gram score is calculated for each document, the separate composite n-gram scores can be combined in a weighted sum using:

$$S(D, Q) = \sum_{N=1}^{K} w_N \cdot S_{N-gram}(D, Q) \qquad \text{EQ. 3}$$

Where $w_N$ is the weight associated with a particular N-gram and K is the number of words in the query.

In many embodiments, the weights of the n-grams increase linearly with the n-gram order. However, other techniques may be used to set the weights of the n-grams.

The scores calculated for each document are used to rank the documents that are to be returned. The documents that are returned may be pruned by removing documents that do not provide a non-zero score for the highest order composite n-gram. This ensures that all of the words of the query appear in order at least once in the document. This requirement enforces a quoted functionality, which requires all of the words present and in the same order as in the query in order for a document to be identified from the query. Another possibility is to allow quoting of phrases within the query, such as JAPAN "NUCLEAR WEAPONS"; entering such a query will return only documents that contain JAPAN and NUCLEAR and WEAPONS, and the words NUCLEAR WEAPONS occur exactly in this order next to each other, but allowing for start and end time tolerance as described above.

At step 320, the documents identified and scored by search unit 428 are returned as ranked documents 430.

In a further embodiment, morphological analysis is performed on the query before applying the query to the index. This generates a list of different forms of the query terms, including other endings for the word. For example, the term "weapons" in a query would produce the alternative "weapon" in which the final "s" has been dropped. Different combinations of the morphologically altered terms can then be used to perform different searches of the inverted index. Each search involves forming composite n-gram scores as above. The composite n-gram scores for the alternative search strings are weighted much less than the composite n-gram scores for the original search string. As a result, documents that contain an alternative search string but not the original search string will be ranked below documents that contain the original search string.

Although the indexing technique has been discussed above with reference to complete words, the same technique can be used to index any speech unit including sub-word units, such as phones or tri-phones. In particular, instead of forming a lattice of words, the speech recognizer forms lattices of sub-word units. These sub-word units are scored in the same manner as the words above using a language model that is based on sequences of sub-word units instead of words. The time specific posterior lattice will then contain individual sub-word units with their associated probabilities.

Upon receiving a search query, the query is decomposed into sub-word units. Documents are then ranked using the scoring techniques described above with sub-word units instead of words. In some embodiments, each word in the query can be treated as being contained in quotations to reduce the number of documents that are returned.

In accordance with some embodiments, the disclosed indexing techniques can be used to index audio in a manner which integrates with existing search indexing architectures. For example, in at least one indexing search architectures, all indexed documents are concatenated into a huge "virtual document," and all the words in each document are assigned a unique "location" (position) within a consecutive range in this "virtual document." The end position of each document is recorded to restore the document ID information of each word. Each word (corresponding to the hypothesis in the present case) is encoded into a 64-bit integer, where the higher-order 56-bits contain the location, while the remaining 8-bits are reserved for the additional attribute information. These 64-bit numbers are inverse-indexed by word IDs.

The disclosed embodiments can capitalize on a very useful property of this architecture, namely that the locations are not necessary to be dense, i.e. it is allowed that locations map to no word. Further, the locations are not necessary to be unique, i.e. it is allowed that multiple words are associated to the same location. Disclosed embodiments can utilize this for storage of multiple word hypotheses with multiple time segmentations.

Specifically, to adapt the aforementioned indexing scheme to one such indexing architecture, several things can be implemented:

1. A document is represented as a sequence of time ranges, with 0, 1 or more candidates associated to each range. Time ranges are associated with center points of word hypotheses. (Alternatively, they could be associated with their start or end points.) A candidate belongs to one range if its center point $t_c=(t_s+t_e)/2$ is in that range. In one implementation, each range has a fixed duration of 0.1 seconds, though other fixed durations can be used. The range of each hypothesis is represented by a location value using a predetermined number of bits (e.g., 56-bits) dictated by the existing architecture. Thus, it can then be directly stored by the existing indexing architecture.

2. The hypothesis duration $d=t_e-t_s$ and the posterior P are quantized together into a predetermined number of bits (e.g., 8-bits), which fit into the reserved bit space in the existing architecture. Note that duration together with the center point is sufficient to restore the start and end point of the candidate. In one implementation, durations are quantized into 22 levels and posteriors into 11 duration-dependent levels. In an extreme approximation, the number of bits for the duration could be 0. During phrase matching, a pre-determined minimum and maximum duration of a word can be assumed. This way, more errors will be made when matching up word sequences as phrases, but there may still be a positive trade-off between the introduced error (which may be small) and the benefit from simplification of realization.

To utilize the above storage architecture, the search algorithm needs to be adapted to retrieve the posterior probability for the query word or string. Because index locations now correspond to time rather than word positions and thus index entries represent entities spanning multiple locations, the phrase matching component also needs to be extended to take the length into account.

Figure 7:
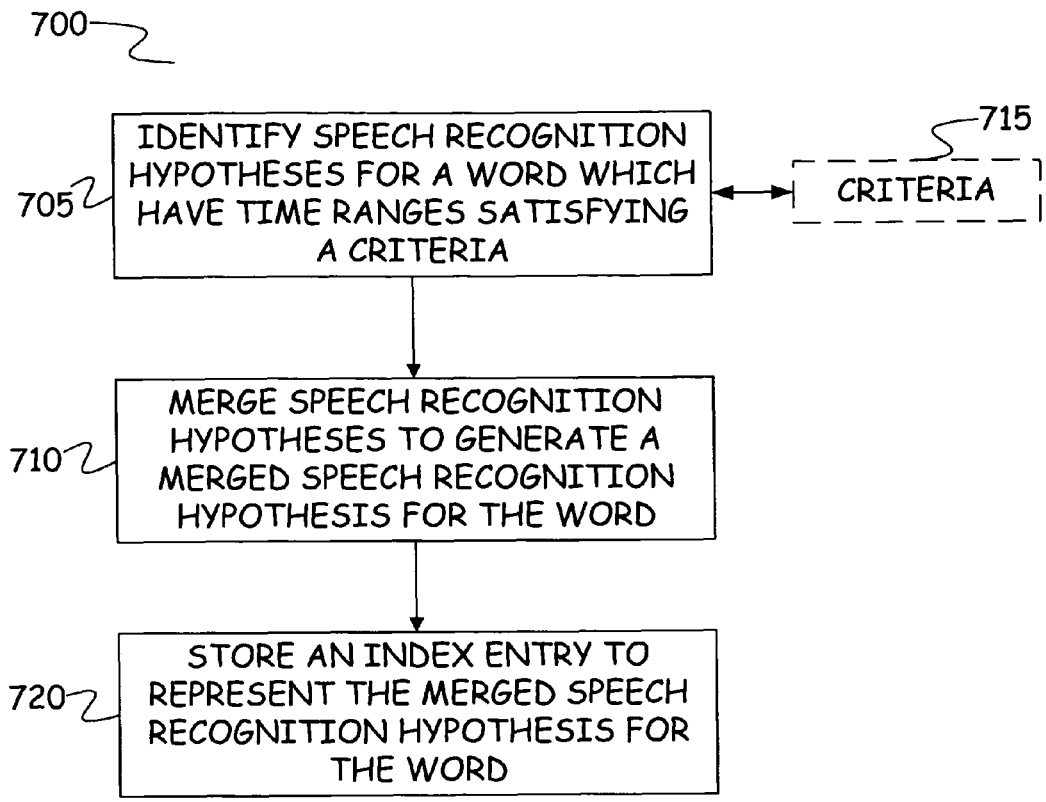
FIGS. 7-10 are flow diagram illustrating method embodiments.
Figure 8:
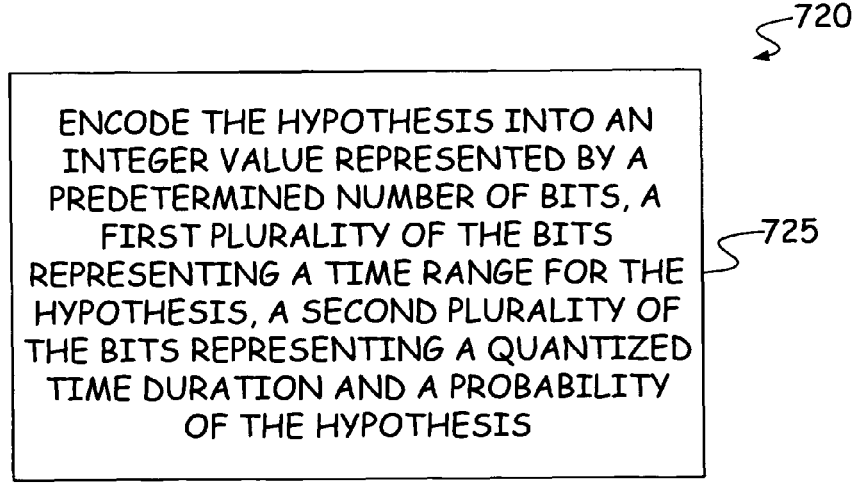

Referring now to FIGS. 7-10, shown are flow diagrams providing alternate illustrations of example method embodiments as described above. Referring first more specifically to FIG. 7, shown is a method 700 of indexing a speech lattice for search of audio corresponding to the speech lattice. At step 705, the method is shown to include the step of identifying at least two speech recognition hypotheses, for a word, which have time ranges satisfying a criteria. The criteria is diagrammatically illustrated at 715 in FIG. 7. As described previously, satisfying criteria 715 can require that the at least two speech recognition hypotheses for the word have identical start times and identical end times. However, in exemplary embodiments, satisfying the criteria requires that the at least two speech recognition hypotheses for the word have start times that are within a predetermined range of each other, and end times that are within a predetermined range of each other.

At step 710 illustrated in FIG. 7, the method is shown to include merging the at least two speech recognition hypotheses to generate a merged speech recognition hypothesis for the word. In some embodiments, merging the speech recognition hypotheses to generate the merged speech recognition hypothesis for the word includes combining the associated probabilities of the at least two speech recognition hypotheses as described previously. Also, in some embodiments, step 710 includes generating the merged speech recognition hypothesis for the word such that start and end times for the merged speech recognition hypothesis are the same as start and end times for a best of the at least two speech recognition hypotheses.

In some embodiments, the method also includes step 720 of storing an index entry to represent the merged speech recognition hypothesis for the word. In some embodiments, storing the index entry to represent the merged speech recognition hypothesis for the word further comprises the step 725 shown in FIG. 8 of encoding the merged speech recognition hypothesis into an integer value represented by a predetermined number of bits. As described above, a first plurality of the predetermined number of bits are used to represent a time range for the merged speech recognition hypothesis, while a second plurality of the predetermined number of bits are used to represent a quantized time duration and a probability of the merged speech recognition hypothesis. This technique allows integration with existing architectures as described above.

As described, the time range encoded into the predetermined number of bits is in exemplary embodiments a center point between the start and end times of the merged speech recognition hypothesis. However, in other embodiments, the time range is one of the start and end times of the merged speech recognition hypothesis.

Figures 9, 10:
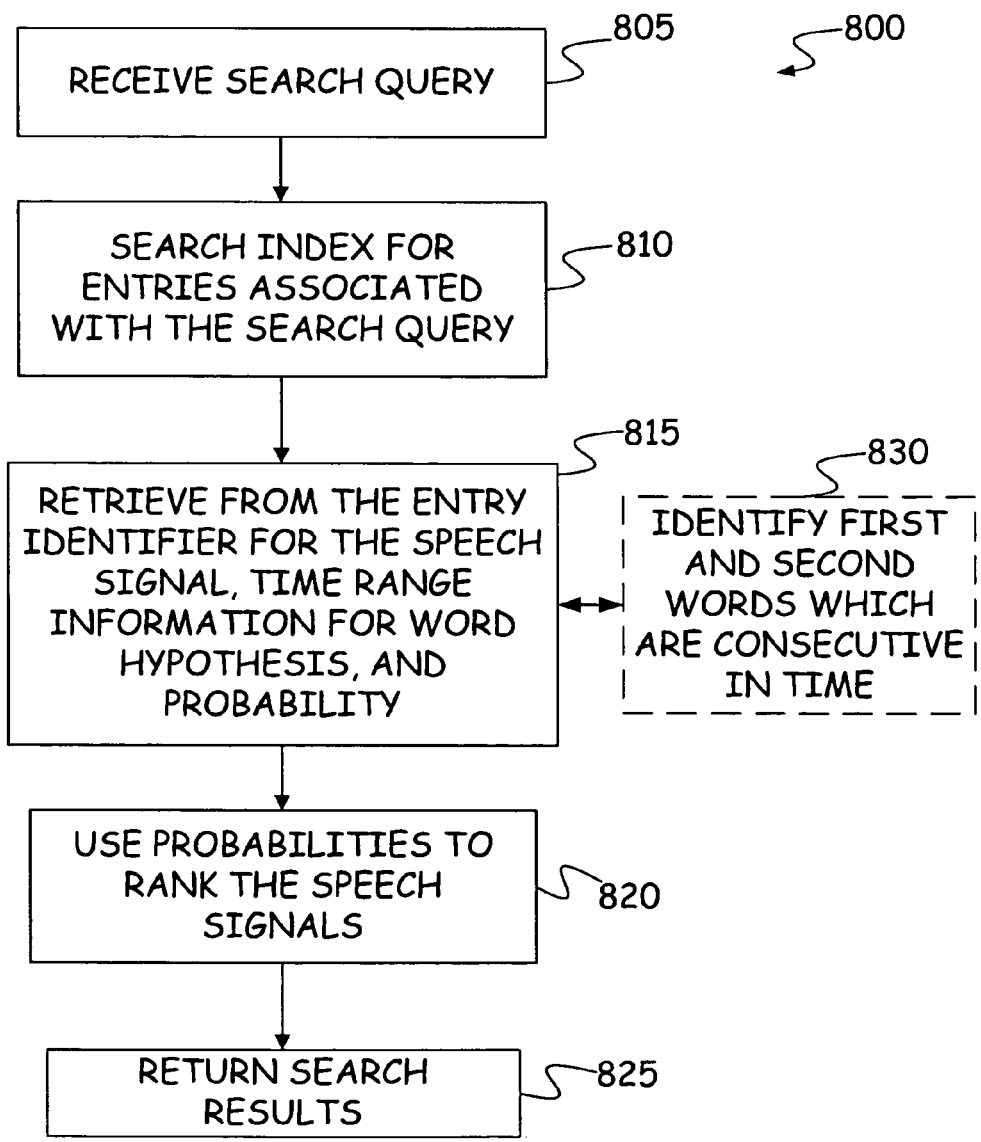

As illustrated at additional and optional step 750 shown in FIG. 9, the method can also include representing audio as a sequence of time ranges with at least one word hypothesis associated with each time range. It is not necessary, however, to have at least one word per time range.

Referring now to FIG. 10, shown is a method 800 of searching audio. At step 805, the method includes receiving a search query. At step 810, the method then includes searching an index corresponding to the audio for entries associated with the search query. For each of a plurality of speech signals, the method then includes the step 815 of retrieving from the entry an identifier for the speech signal, time range information for a word hypothesis associated with the entry, and a probability of the word hypothesis appearing at the time range given the speech signal. At step 820, the method is shown to include using the probabilities to rank the speech signals relative to each other to form ranked speech signals. Based on the ranked speech signals, the method then returns search results at step 825.

As described in the above examples, the time range information for the word hypothesis associated with each entry is typically indicative of a start time and an end time of the word hypothesis. The search query will often be representative of a phrase containing first and second consecutive words. In these cases, step 810 of searching the index for entries associated with the search query further comprises searching the index for entries associated with the first and second words in the query. The method can then include step 830 of identifying, from the time range information of the entries associated with the first and second words in the query, occurrences of the first and second words which are consecutive in time in a speech signal. This determination can be based upon an end time of the first word in the speech signal and a start time of the second word in the speech signal. As discussed, in some embodiments the first and second words are considered to be consecutive in time when an end time of the first word in the speech signal is substantially identical to a start time of the second word in the speech signal. However, in other embodiments as described above, the first and second words are considered to be consecutive in time when the end time of the first word in the speech signal is within a predetermined time range of the start time of the second word in the speech signal. This can even result in the end time of the first word in the speech signal being after the start time of the second word in the speech signal in the case of merged hypotheses.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of indexing a speech lattice for search of audio corresponding to the speech lattice, the method comprising:
using a processor to identify at least two speech recognition hypotheses for a particular word which have time ranges satisfying a criteria, each of the at least two speech recognition hypotheses for the particular word having an associated start time, an associated end time, and an associated probability, at least some of the at least two speech recognition hypotheses having different associated start and/or associated finish times from each other, and satisfying the criteria requires that the at least two speech recognition hypotheses for the particular word have start times that are within a predetermined range of each other, and end times that are within a predetermined range of each other;
using the processor to merge the at least two speech recognition hypotheses, at least some of which having different associated start and/or associated finish times from each other, to generate a merged speech recognition hypothesis for the particular word such that start and end times for the merged speech recognition hypothesis are the same as start and end times for a best of the at least two speech recognition hypotheses, wherein merging the at least two speech recognition hypotheses to generate the merged speech recognition hypothesis for the particular word further comprises combining the associated probabilities of the at least two speech recognition hypotheses for the particular word which have time ranges satisfying the criteria; and
storing an index entry to represent the merged speech recognition hypothesis for the particular word.

2. The computer-implemented method of claim 1, wherein storing the index entry to represent the merged speech recognition hypothesis for the particular word further comprises encoding the merged speech recognition hypothesis into an integer value represented by a predetermined number of bits, a first plurality of the predetermined number of bits representing a time range for the merged speech recognition hypothesis, a second plurality of the predetermined number of bits representing a quantized time duration and a probability of the merged speech recognition hypothesis.

3. The computer-implemented method of claim 2, wherein the time range for the merged speech recognition hypothesis is a center point between the start and end times of the merged speech recognition hypothesis.

4. The computer-implemented method of claim 2, wherein the time range for the merged speech recognition hypothesis is one of the start and end times of the merged speech recognition hypothesis.

5. The computer-implemented method of claim 2, and further comprising representing audio as a sequence of time ranges with at least one word hypothesis associated with each time range.

6. The computer-implemented method of claim 1, wherein each of the at least two speech recognition hypotheses for the particular word in the speech lattice include a word ID that identifies the particular word.

7. The computer-implemented method of claim 6, wherein each of the at least two speech recognition hypotheses for the particular word in the speech lattice comprise an n-tuple that includes the start time associated with the speech recognition hypothesis, the end time associated with the speech recognition hypothesis, the word ID that identifies the particular word, and the associated probability for the speech recognition hypothesis.

8. A computer-implemented method comprising:
accessing a speech lattice representing a plurality of speech recognition hypotheses for a portion of speech data, the plurality of speech recognition hypotheses including a plurality of word hypotheses for a plurality of words in the portion of speech data, each word hypothesis of the plurality of word hypotheses including an n-tuple representing a start time associated with the word hypothesis, an end time associated with the word hypothesis, a word TD that identifies a particular word represented by the word hypothesis, and an associated probability for the word hypothesis;
selecting a set of word hypotheses, from the plurality of word hypotheses, that are hypotheses for a same word in the portion of speech data and that have start and end times that satisfy a criteria, the set of word hypotheses being selected using the word IDs, start times, and end times of the n-tuples for the plurality of word hypotheses, wherein
each word hypothesis in the set that satisfy the criteria has an associated start time within a first predetermined range of the start times of all other word hypotheses in the set and has an associated end time within a second predetermined range of the end times of all other word hypotheses in the set, and
at least two word hypotheses in the set have different associated start times and/or different associated end times from each other; and
generating, using a processor of a computer, a merged word hypothesis for the same word in the portion of speech data by merging the set of word hypotheses, wherein generating comprises:
merging the at least two word hypotheses in the set having different associated start times and/or different associated end times from each other;
assigning start and end times to the merged word hypothesis that are the same as the start and end times associated with the word hypothesis in the set having a highest probability; and
assigning a probability to the merged word hypothesis by combining the associated probabilities of the merged set of word hypotheses; and
storing an index entry to represent the merged word hypothesis.

9. The computer-implemented method of claim 8, wherein the portion of speech data comprises a spoken sentence.

10. The computer-implemented method of claim 8, and comprising:
accessing speech data and forming the speech lattice by generating the plurality of speech recognition hypotheses from the speech data, wherein generating the plurality of speech recognition hypotheses comprises generating a first text transcript for the portion of speech data and at least one alternative speech recognition hypothesis for the portion of speech data.

11. The computer-implemented method of claim 10, wherein the plurality of speech recognition hypotheses comprise hypotheses for a phrase in the speech data.

12. The computer-implemented method of claim 8, wherein storing the index entry to represent the merged word hypothesis comprises encoding the merged word hypothesis into an integer value represented by a predetermined number of bits, a first plurality of the predetermined number of bits representing a time range for the merged speech recognition hypothesis, a second plurality of the predetermined number of bits representing a quantized time duration and a probability of the merged word hypothesis.

13. The computer-implemented method of claim 12, wherein the time range for the merged word hypothesis is a center point between the start and end times of the merged word hypothesis.

14. The computer-implemented method of claim 12, wherein the time range for the merged word hypothesis is one of the start and end times of the merged word hypothesis.

15. The computer-implemented method of claim 12, and further comprising representing audio as a sequence of time ranges with at least one word hypothesis associated with each time range.

16. The computer-implemented method of claim 8, wherein at least one word hypothesis in the set of word hypotheses has a different associated start time and/or different associated end time than the start and end times assigned to the merged word hypothesis.

* * * * *

UNITED STATES PATENT AND TRADEMARK OFFICE
CERTIFICATE OF CORRECTION

| | | |
|---|---|---|
| PATENT NO. | : 7,831,425 B2 | |
| APPLICATION NO. | : 11/300735 | |
| DATED | : November 9, 2010 | |
| INVENTOR(S) | : Alejandro Acero et al. | |

It is certified that error appears in the above-identified patent and that said Letters Patent is hereby corrected as shown below:

In column 16, line 15, in Claim 8, delete "TD" and insert -- ID --, therefor.

Signed and Sealed this
Eighth Day of February, 2011

David J. Kappos
*Director of the United States Patent and Trademark Office*